United States Patent
McGregor et al.

(10) Patent No.: US 6,530,403 B2
(45) Date of Patent: Mar. 11, 2003

(54) FILL TUBE CONTROL APPARATUS

(75) Inventors: James R. McGregor, 23175 France Cir., Lakeville, MN (US) 55044; Scott Anderson, Owatonna, MN (US); Keith Kruckeberg, Owatonna, MN (US)

(73) Assignee: James R. McGregor, Lakeville, MN (US)

( * ) Notice: Subject to any disclaimer, the term of this patent is extended or adjusted under 35 U.S.C. 154(b) by 0 days.

(21) Appl. No.: 09/771,758

(22) Filed: Jan. 29, 2001

(65) Prior Publication Data

US 2002/0100519 A1 Aug. 1, 2002

(51) Int. Cl.⁷ .............................. B67C 3/26; B67C 3/34
(52) U.S. Cl. ...................... 141/264; 141/263; 141/287; 222/207; 222/212; 222/214
(58) Field of Search ................... 141/251–264, 141/287; 222/207, 212, 214, 215, 181.2, 181.1

(56) References Cited

U.S. PATENT DOCUMENTS

| | | | | |
|---|---|---|---|---|
| 3,596,688 A | * | 8/1971 | Vogt | 141/287 |
| 3,820,691 A | * | 6/1974 | Saur | 222/560 |
| 4,703,782 A | * | 11/1987 | Henkel, Sr. | 141/65 |
| 6,293,426 B1 | * | 9/2001 | Papera | 222/1 |

* cited by examiner

*Primary Examiner*—Timothy L. Maust
(74) *Attorney, Agent, or Firm*—Moore & Hansen

(57) ABSTRACT

A control mechanism for controlling the flow of a particulate material through a conduit and comprises a bladder mounted within the conduit that is inflatable between a first, deflated state and a second, inflated state. In its first, deflated state the bladder allows the particulate material to flow freely through the conduit, and in its second, inflated state the conduit is substantially blocked by the inflated bladder and no particulate material may pass. An alternate embodiment of an exteriorly mounted control mechanism comprises a stopper that is moved between a first, open position away from an open end of the conduit and a second, closed position in which the stopper is in sealing contact with end of the conduit.

7 Claims, 4 Drawing Sheets

FILL TUBE CONTROL APPARATUS

BACKGROUND OF THE INVENTION

The present invention is drawn to an apparatus for precisely controlling the flow of a particulate material into a bag or other container. Specifically, the present invention is a valve which can be actuated to close a conduit through which the particulate material is flowing.

In the course of filling particulate material into bags from a dispensing spout connected to a supply hopper, it is common practice to initially fill the bag in a bulk fill operation at a relatively high speed. A final charge of material is subsequently delivered into the bag to provide a total charge weight within a bag of particular volume or weight size. One such machine is of the vertical, bottom-fill auger type machine as disclosed in U.S. Pat. No. 5,109,894 issued to Harold R. McGregor and commonly assigned herewith. As disclosed in that patent, the same, relatively high speed and relatively large diameter auger utilized for bulk feed of the initial charge of material into a bag is also utilized to top off the bag with a final charge of material. Load cells provided on the fill spout provide a reading of the initial weight charge delivered into the bag; and, thereafter, a computer or central processing unit (CPU) actuates the same fill auger at a slower speed, in response to a read-out of the initial weight charge, for a predetermined time or a predetermined number of revolutions of the auger to top off the bag.

Such a total fill system suffers from several problems. First of all, an undue time delay is caused by holding the same bag on the main filling spout while a single set of load cells record the initially filled weight of the bag, after which a computer receives and processes that filled weight data and thereafter actuates the bulk auger, at a slower speed, for a calculated number of revolutions to deliver the final charge into the bag. The total fill time is further extended by the time required to lift the vertical fill auger out of the material in the bag, and to thereafter lower the bag from the spout. Secondly, it is very difficult to obtain the required, precise control of the discharge of the slight amount of particulate material, e g., one to three pounds, for accurately topping off the bag to the total, predetermined charge weight desired.

One solution to the problem is to utilize a two stage bag filling system. In such a system, a first machine dispenses an initial, bulk charge of material into the bag at a relatively high speed from a dispensing spout. The bag is then moved to a new location where a second machine adds the final, small, top-off charge of material to the bag. One example of such a system and a machine for implementing it, is given in U.S. Pat. No. 5,979,512, granted to James McGregor, et al. and commonly assigned herewith. In operation, a bag containing the initial, bulk charge of material is delivered into the top-off station where most of the weight of the substantially filled bag is registered on a first set of load cells. A second set of load cells, preferably mounted at an elevated level on a frame assembly of the top-off station, registers and weighs the final, top-off charge dispensed into the top of the partially filled bag.

While a two stage system as described above is perfectly able to fill a bag or container with an accurate and precise charge of particulate material, two separate stations are required for the bulk fill and top-off actions. It is therefore an object of the present invention to increase the accuracy and precision of a bulk filling machine by providing it with a flow control apparatus to control the flow of the particulate material into a bag or container. It is another object of this invention to provide an apparatus that will allow a user to more accurately and precisely control the flow of particulate materials through any fill tube or conduit used in a bag filling operation.

SUMMARY OF THE INVENTION

The basic objectives of this invention are realized by providing a control mechanism for controlling the flow of a particulate material through a conduit that comprises a bladder mounted within the conduit and which is inflatable between a first, deflated state and a second, inflated state. In its first, deflated state the bladder allows the particulate material to flow freely through the conduit, and in its second, inflated state the conduit is substantially blocked by the inflated bladder and no particulate material may pass.

One embodiment of the control mechanism is arranged and constructed to be mounted on a rotatable material feed auger received within the conduit. In this embodiment the bladder is mounted on the free end of the auger within the conduit. In another embodiment of the control mechanism the bladder is mounted within the conduit on a plurality of stays. In both of these embodiments it is preferred that the bladder be centrally mounted within the conduit.

In order to actuate the bladder of the control mechanism between its first and second states, the bladder of the control mechanism is connected in fluid flow relation with a source of pressurized fluid that may selectively actuate the bladder between its inflated and deflated states. Most often the bladder has a substantially circular inflated shape. But, where a rectangular conduit is used, the bladder may have a substantially rectangular shape when inflated.

The control mechanism can also be described as a membrane mounted within the conduit and constructed and arranged to allow the flow of material through the conduit when the membrane is in a first, contracted state and to substantially block the flow of material through the conduit when the membrane is in a second, extended state. An actuation mechanism operating on pneumatic or hydraulic principles is arranged to actuate the membrane between its first and second states. As described above, the membrane may be mounted to the free end of the auger received within the conduit or may be mounted within the conduit upon a plurality of stays. Again, it is preferred that the membrane be centrally mounted within the conduit. The membrane may also be substantially circular or rectangular in shape when in its second, extended state.

A method of accurately and precisely filling a container with a predetermined charge of material through a conduit provided with a control mechanism begins with the step of positioning an open end of the conduit adjacent or in an opening in the container. Next, the conduit control mechanism is opened and a continuous flow of the material is introduced into the conduit and thereby into the container. The container is then weighed to determine whether the predetermined charge of material has been placed in the container. Alternatively, whether the predetermined charge of particulate materials has been placed in the container can be assessed on the basis of the number of turns of a feed auger or on the basis of how long the particulate material has been flowing from the conduit. When the predetermined charge of particulate material has been added to the container, the continuous flow of particulate material is cut off and the control mechanism is simultaneously actuated to a closed position, thereby substantially blocking the flow of material through the conduit to ensure that excess material already in the conduit does not enter the container.

A bag filling machine which incorporates the present invention comprises a material supply hopper having an outlet and a first flow control mechanism coupled to the outlet of the hopper to control the flow of material therefrom. A conduit having an inlet and an outlet has its inlet coupled to the flow control mechanism of the supply hopper. The first flow control mechanism is typically a gate valve or the like. A material supply auger is rotatively disposed within the conduit for conveying material through the conduit in a controllable manner. A second flow control mechanism is secured to a free end of the supply auger and is arranged and constructed to control the flow of material through the conduit. This second flow control mechanism comprises a bladder or membrane secured to the free end of the auger within the conduit. The bladder is arranged and constructed to block substantially the flow of any of the particulate material from the conduit when the bladder or membrane is in its inflated state. In order to actuate the second flow control mechanism between deflated and inflated states, a supply of pressurized fluid is coupled in fluid flow relation to the bladder. The bladder of the second flow control mechanism may be circular or rectangular when it is in its inflated state.

An alternate embodiment of an apparatus for controlling the flow of material through a conduit is preferably mounted exterior to the conduit, though portions of the apparatus may be mounted interior to the conduit. This embodiment of an apparatus for controlling the flow of material through a conduit comprises a stopper that is disposed adjacent to an open end of the conduit through which material is passed. A support device is coupled to the stopper for moving the stopper between a first, open position in which material is permitted to flow through the conduit, and a second, closed position in which the stopper is in sealing contact with the open end of the conduit so as to prevent the flow of material therethrough. A reciprocating mechanism is coupled to the support device and provides motive power to the support device for moving the stopper between its first and second positions. Preferably, the stopper will comprises an elastomeric plug that seals the open end of the conduit when the stopper is in its second, closed position.

The support device that causes the stopper to move between its first and second positions comprises a plurality of rods, each having a first end coupled to the stopper and a second end coupled to a sliding collar that is received over the conduit. Rod guides received over the conduit between the collar and stopper engage the rods and ensure that each rod moves along a vertical path.

The reciprocating device may be any device that is capable of moving the stopper between its first and second positions. The reciprocating device may be mounted directly to the conduit or may be mounted to the framework of the bag filling machine independent of the conduit. One embodiment of the reciprocating device essentially comprises a reciprocating piston that is coupled to a shaft in such a manner as to cause the shaft to rotate in response to the reciprocating motion of the piston of the power cylinder. The shaft is in turn coupled to the support device by at least one linkage such that the support device moves in conjunction with the reciprocating motion of the piston of the power cylinder. A linkage that is useful in coupling the shaft of the reciprocating device to the support device is a two bar pinned linkage having a first bar with a first end that is fixedly secured to the shaft and a second end that is rotatively pinned to the first end of a second bar. The second end of the second bar is rotatively pinned to the support device so as to impart motive power thereto.

As indicated above, the reciprocating device may be coupled to the framework of a bag filling machine or directly to the conduit. Where the reciprocating device is to be coupled to the conduit, it is preferred to mount it upon a support platform that is coupled to the conduit.

DETAILED DESCRIPTION

Figure 1:
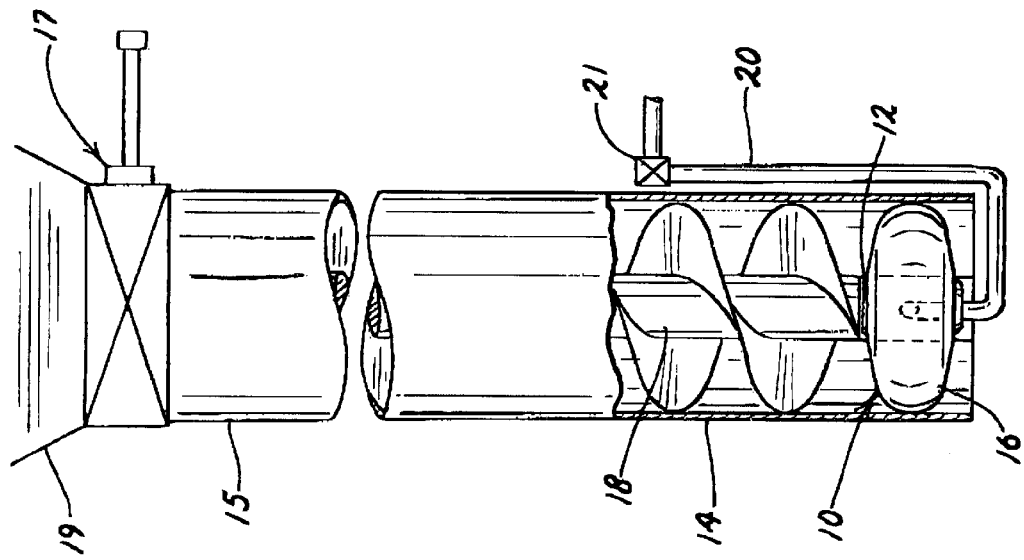
FIG. 1 is a cut away side view of the fill tube control apparatus of the present invention mounted on the shaft of an auger in its uninflated state.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention which may be embodied in other specific structure.

The fill tube control apparatus 10 of the present invention is preferably used in conjunction with a bag filling machine of the types described in U.S. Pat. Nos. 5,109,894 and 5,771,667 both issued to Harold R. McGregor, both of which are hereby incorporated by reference. However, it is to be understood that the control apparatus 10 may be adapted for use in a slip tube type of bag filling machine such as that described in U.S. patent application Ser. No. 09/251,603 which is also copending and commonly assigned herewith. U.S. patent application Ser. No. 09/251,603 is also hereby incorporated by reference. The control apparatus 10 of the present invention may also be adapted for use in various conveying applications as will be understood in light of the description given below.

Figure 2:
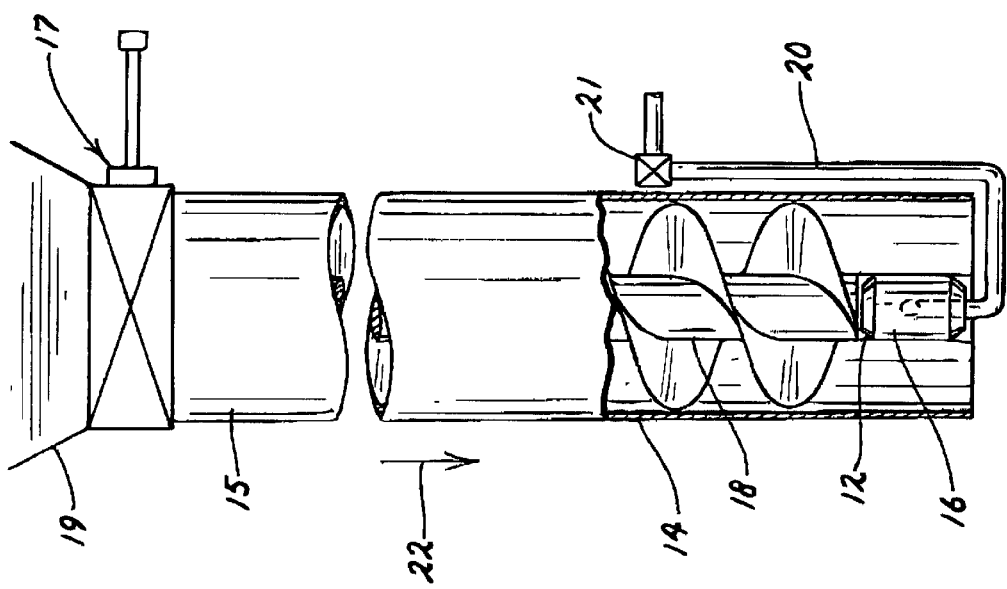
FIG. 2 is a cut away side view of the fill tube control apparatus of the present invention mounted on the shaft of an auger in its inflated state.

The bag filling machine with which the preferred embodiment of the present invention is used as illustrated in FIGS. 1 and 2, comprises a hopper 19 for storing and dispensing particulate materials such as flour, animal feed, chemicals, etc. The hopper 19 has a valve mechanism 17, preferably a gate valve, secured to its outlet for controlling the flow of the particulate materials from the hopper 19 and into an inlet 15 of a conduit or fill tube 14. Particulate material from the hopper 19 passes through fill tube 14 and into a bag or container (not shown) through an outlet 13 of the fill tube 14.

The fill tube control apparatus 10 of the present invention is comprised of a sealing manifold 12 mounted within the conduit 14. The sealing manifold 12 has coupled thereto a sealing bladder 16 which may be caused to inflate, thereby sealing the conduit 14 and preventing the flow of particulate material from the outlet 13 of the conduit 14. In the embodiment illustrated in FIGS. 1 and 2, the fill tube or conduit 14 is provided with an auger 18. Bags or containers being filled are moved in relation to a fill tube 14 of the type which comprise an auger 18. The auger 18 allows for a more controlled filling procedure in that the auger 18 conveys the particulate material through the fill tube 14 at a known rate. However, even when the auger 18 has stopped, some particulate material may fall from the fill tube 14 and auger 18 into the bag. In order to prevent particulate material from exiting the fill tube 15 and falling into the bag or container even after the auger 18 has stopped, the sealing manifold 12 is mounted on the free end of an auger 18. A valve 21 is connected inline with the fluid supply line 20 and controls the flow of a pressurized fluid, preferably air, into and out of the sealing manifold 12 and sealing bladder 16.

In operation, a bag hanging mechanism of the type described in U.S. Pat. No. 5,109,894 raises and lowers a bag or other container in relation to the free end of the conduit or fill tube 14. The bag hanging mechanism preferably also includes a weighing mechanism that is associated with the bag hanging mechanism, with a conveying apparatus on which the bag or container rests during the filling process, or both. Once a bag or container has been placed in, or grasped by, the bag hanging mechanism, the bag hanging mechanism is actuated to place the opening of the bag or container over the free end of the fill tube 14. The valve mechanism 17 and auger 18 are then actuated to convey particulate materials through the fill tube 14 and into the bag. As seen in FIG. 1, when the fill tube control apparatus 10 is in a first, uninflated state the particulate material passes freely through the fill tube 14 in the direction indicated by arrow 22. When a predetermined charge of particulate material has been placed in the bag, as determined by the weighing mechanism or by a predetermined number of rotations of the auger 18, the auger 18 stops and valve 21 is actuated to inflate the sealing bladder 16 as seen in FIG. 2. Inflation of the sealing bladder 16 effectively seals the fill tube 14 and prevents any of the particulate material which may be caught in the auger 18 from falling into the bag or container.

Figure 4:
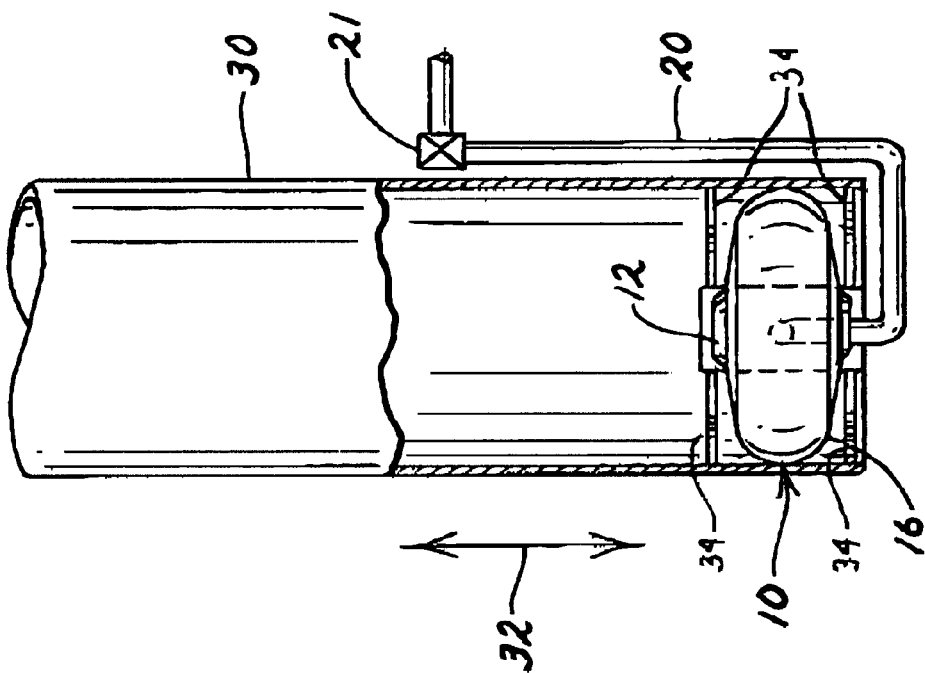
FIG. 4 is a cut away side view of the fill tube control apparatus of the present invention mounted on stays within a conduit in its inflated state.
Figure 3:
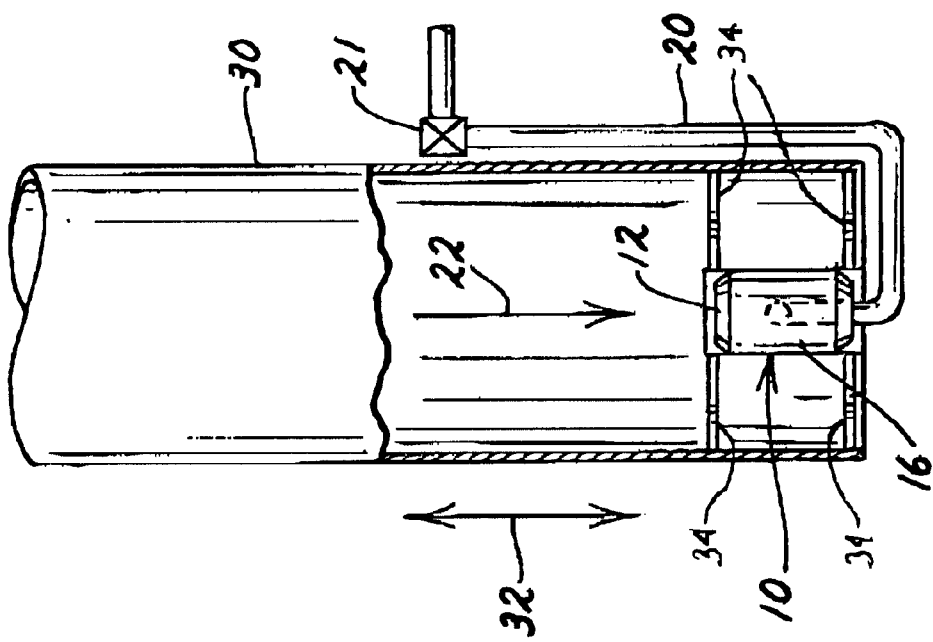
FIG. 3 is a cut away side view of the fill tube control apparatus of the present invention mounted on stays within a conduit in its uninflated state.

An alternative embodiment of the present invention is illustrated in FIGS. 3 and 4. In this embodiment, the control apparatus 10 is mounted within a moveable conduit or slip tube 30. The slip tube 30 moves vertically as indicated by direction arrow 32 and is inserted into a bag or container so as to fill the bag or container from the bottom. As the bag or container fills, the slip tube 30 is retracted upwards to maintain its free end at or near the rising level of particulate material in the container. The slip tube 30 is typically telescopically received over a fixed tube (not shown) that, like the fill tube or conduit 14 illustrated in FIGS. 1 and 2, is connected to a valve mechanism and a supply hopper. In the embodiment illustrated in FIGS. 3 and 4, the control apparatus 10 is mounted within the slip tube on a number of stays 34. Each stay 34 is secured at one end to the interior wall of the slip tube 30 and at its opposite end to the sealing manifold 12. In this manner the sealing manifold 12 and the entire control apparatus 10 is suspended within the slip tube 30 in a spaced apart relationship to the interior walls of the slip tube 30. It is preferred to utilize stays at both the top and bottom ends of the sealing manifold 12 to prevent the manifold from between twisted or rotated by the forces exerted thereon by the particulate materials. In addition, in order to ensure that the control apparatus is maintained securely in its preferred, centrally located position within the slip tube, it is preferred to utilize at least 3 stays 34 at the top and at the bottom of the sealing manifold 12, though more or fewer stays 34 may be used.

The embodiment illustrated in FIGS. 3 and 4 functions in substantially the same manner as the embodiment illustrated in FIGS. 1 and 2. In operation, spout clamps and gusset pleat gripping assemblies of the type described in U.S. Pat. No. 5,768,863, commonly assigned herewith and hereby incorporated by reference, hold a bag or other container in a generally static position so that the slip tube 30 may be inserted into the bag or container for filling. While it is common industry practice to convey pre-weighed charges of particulate materials through a slip tube type bag filling machine, the spout clamps and gusset pleat gripping assemblies may include a weighing mechanism that may be associated with the spout clamps and gusset pleat gripping assemblies, with a conveying apparatus on which the bag or container rests during the filling process, or both. Once a bag or container has been placed in, or grasped by, the spout clamps and gusset pleat gripping assemblies, the slip tube 30 is inserted into an opening in the bag or container. A valve mechanism is then actuated to convey particulate materials from a supply hopper through the slip tube 30 and into the bag. As seen in FIG. 3, when the control apparatus 10 is in a first, uninflated state the particulate material passes freely through the slip tube 30 in the direction indicated by arrow 22. When the predetermined charge of particulate material has been placed in the bag, the valve 21 is actuated to inflate the sealing bladder 16 as seen in FIG. 4. Inflation of the sealing bladder 16 effectively seals the slip tube 30 and prevents any additional particulate material which may be caught in the slip tube 30 from falling into the bag or container.

As can be appreciated, the control apparatus 10 is preferably used with a conduit 14, 30 having a round cross section, though it is to be understood that the control apparatus 10 may be adapted for use with conduits 14, 30 having rectangular, oval or other cross sectional shapes. In addition, the embodiments of the control apparatus 10 described in conjunction with FIGS. 1–4 is preferably actuated via pressurized air. However, it is to be understood that any pressurized fluid, including hydraulic fluids may be used to actuate the control apparatus. And, while the control apparatus 10 of the present invention is described in conjunction with its preferred use in conduits 14, 30 used in filling bags or other containers, the present invention may also be adapted for use in other conveying operations, including but not limited to, pre-weighing charges of particulate materials and in mixing applications.

Figure 5:
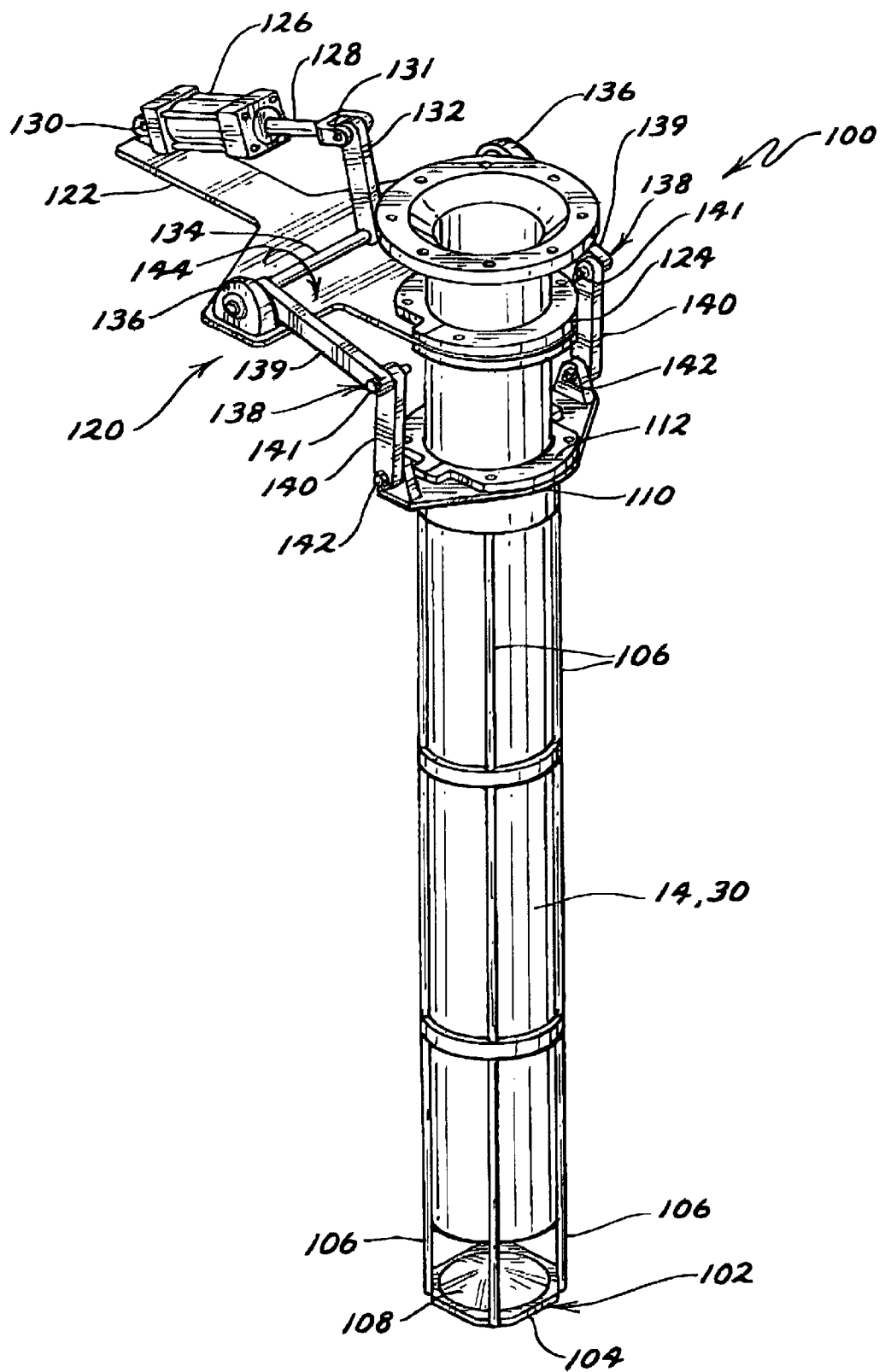
FIG. 5 is a perspective view of a fill tube control apparatus mounted exteriorly to a conduit.
Figure 6:
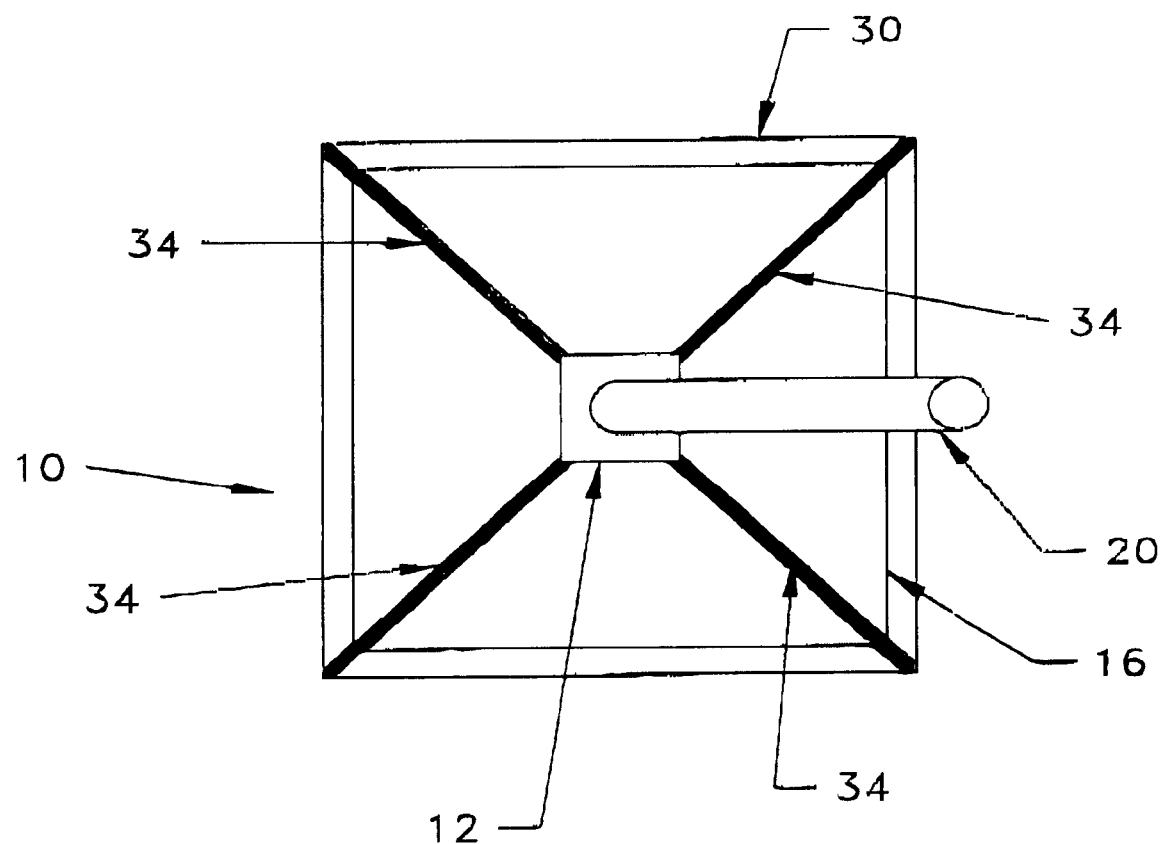
FIG. 6 is a plan view of an alternative embodiment of a fill tube control apparatus of the present invention.

An alternate embodiment of a fill tube control apparatus, illustrated in FIG. 5 and identified by reference number 100, comprises a reciprocating stopper 102 that is constructed and arranged to open and close the lower, open end of a conduit 14, 30. In this embodiment of a fill tube control apparatus, the stopper 102 is comprised of a platform 104 that is supported by and reciprocates upon a plurality of rods 106. A plug 108, preferably have elastomeric properties, is secured to an upper surface of the platform 104 of the stopper 102. When the rods 106 raise the stopper 102, the plug 108 is forced into sealing contact with the lower, open end of the conduit 14, 30. In this manner, particulate materials within the conduit 14, 30 are prevented from exiting the conduit.

The upper end of rods 106 are secured to a collar 110 that is received over the conduit 14, 30. Collar 110 is free to slide vertically on conduit 14, 30 and has wear elements 112 secured thereto in order to prevent wear to the conduit 14, 30. Wear elements 112 also take up slack between the collar 110 and the conduit 14, 30. As collar 110 moves downward toward the lower open end of the conduit 14, 30, rods 106 move the stopper 102 away from the open end of the conduit, thereby allowing particulate materials to flow through the conduit. Similarly, as the collar 110 moves upward, away from the lower, open end of the conduit 14, 30, the stopper 102 is moved into sealing contact with the open end of the conduit 14, 30. At least one guide 114 is secured to the conduit 14, 30 between the collar 110 and the lower, open end of the conduit 14, 30. The guides 114 are coupled to the rods 106 and act to ensure that the rods 106 move along a vertical path and help to center the stopper 102 over the open, lower end of the conduit 14, 30.

A mechanical linkage 120 is constructed and arranged to raise and lower the collar 110 and hence the stopper 102. One embodiment of an appropriate linkage 120 comprises a support plate 122 that extends laterally outward from the conduit 14, 30. Preferably, the support plate 122 is coupled to the conduit 14, 30 in order to ensure that the linkage 120 maintains a substantially constant spatial relationship to the conduit 14, 30. It is to be noted that the embodiment of the fill tube control apparatus 100 illustrated in FIG. 5 is adapted for use with a conduit that is typically employed with an auger (not shown). Therefore, in the embodiment of FIG. 5, collar 124 fixedly secures the supporting plate 122 to the conduit 14, 30, though were the apparatus 100 to be employed with a slip tube type of conduit, the collar 124 would preferably slid upon the conduit 14, 30 and the support plate 122 would be secured to the frame work of the bag filling machine.

A power cylinder 126 having a reciprocable piston 128 is rotatably secured to the support plate 122 by pin 130. The reciprocable piston 128 of power cylinder 126 is in turn rotatively connected to arm 132 by pin 131. Arm 132 is fixedly secured to shaft 134. As piston 128 is extended, arm 132 rotates towards the conduit 14, 30 as indicated by arrow 144, and because shaft 134 is constrained to rotate with arm 132, shaft 134 rotates in the same direction as arm 132. Shaft 134 is supported between a pair of bearings 136 that are themselves secured to the support plate 122. Collar 110 is coupled to the shaft 134 by a pair of two-bar pinned linkages 138. Each of the two-bar pinned linkages 138 comprises a first bar 139 that has a first end that is received on shaft 134. Each of these first bars 139 are constrained to rotate with shaft 134. The second end of bar 139 of each two-bar linkage 138 is rotatively pinned to a second bar 140 by pin 141. The second end of the second bar 140 is rotatably pinned to collar 110 by pins 142.

As can be appreciated, as piston 128 of cylinder 126 is extended, arm 132 causes shaft 134 to rotate in a clockwise direction indicated at 144. Because the first bars 139 of the pair of two-bar pinned linkages 138 are constrained to rotate with shaft 134, the two-bar pinned linkages 138 lower the collar 110. As collar 110 moves downward toward the lower, open end of the conduit 14, 30, stopper 102 moves away from the open end of the conduit to its open position. In this position particulate matter is allowed to flow through the conduit 14, 30 either under the influence of gravity or forced there-through by an auger. To bring the stopper 102 to its second, closed position in sealing contact with the open lower end of the conduit 14, 30, piston 128 of cylinder 126 is retracted. In retracting the piston 128, arm 132 is constrained to rotate in the direction opposite that indicated by direction arrow 144. The rotation of arm 132 imparts that same rotation in shaft 134 and subsequently in the first bars 139 of the pair of two-bar pinned linkages 138. As the bars 139 of the two-bar pinned linkages 138 rotate in the direction opposite and indicated by direction arrow 144, collar 110 is pulled upward by the pair of two-bar pinned linkages 138. As collar 110 moves upward, rods 106 move stopper 102 into sealing contact with the open lower end of the conduit 14, 30, thereby closing the conduit and prevention the flow of particulate material therethrough.

The invention described above may be embodied in other forms without departing from the spirit or essential characteristics thereof. The embodiments disclosed in this application are to be considered in all respects as illustrative and not restrictive. The scope of the invention is indicated by the appended claims rather than by the foregoing description and all changes which come within the meaning and range of equivalency of the claims are intended to be embraced therein.

What is claimed is:

1. A control mechanism for controlling the flow of a particulate material through a conduit comprising:

a bladder adapted for mounting within the conduit and inflatable between a first deflated state in which the bladder allows the material to flow freely through the conduit, and a second, inflated state in which the conduit is substantially blocked by the inflated bladder and wherein the conduit further comprises a rotatable material feed auger received within the conduit and wherein the bladder is mounted to a free end of the auger within the conduit.

2. A control mechanism for controlling the flow of a particulate material through a conduit comprising:

a bladder adapted for mounting within the conduit and inflatable between a first deflated state in which the bladder allows the material to flow freely through the conduit, and a second, inflated state in which the conduit is substantially blocked by the inflated bladder and wherein the bladder is mounted within the conduit on a plurality of stays.

3. The control mechanism of claim 2 wherein the bladder is centrally mounted within the conduit.

4. The control mechanism of claim 1 wherein a source of pressurized fluid is connected in fluid flow relation to the bladder to expand the bladder to the inflated state.

5. The control mechanism of claim 3 wherein the bladder has a substantially circular inflated shape.

6. The control mechanism of claim 3 wherein the bladder has a substantially rectangular shape when inflated.

7. The control mechanism of claim 2 wherein a source of pressurized fluid is connected in fluid flow relation to the bladder to expand the bladder to the inflated state.

* * * * *